United States Patent
Ohnishi

(10) Patent No.: US 7,193,750 B2
(45) Date of Patent: Mar. 20, 2007

(54) IMAGE PROCESSING METHOD AND APPARATUS, AND STORAGE MEDIUM THEREFORE

(75) Inventor: Yoshinari Ohnishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/032,100

(22) Filed: Jan. 11, 2005

(65) Prior Publication Data

US 2005/0219619 A1    Oct. 6, 2005

Related U.S. Application Data

(62) Division of application No. 09/571,153, filed on May 16, 2000, now Pat. No. 6,853,465.

(30) Foreign Application Priority Data

May 18, 1999  (JP)  .................................. 11-137785
Sep. 17, 1999  (JP)  .................................. 11-263903

(51) Int. Cl.
  *G06F 15/00*  (2006.01)
  *G06K 15/00*  (2006.01)
  *G03F 3/08*  (2006.01)
(52) U.S. Cl. .......................... 358/1.9; 358/2.1; 358/518
(58) Field of Classification Search ................ 358/1.9, 358/518, 523, 527, 538, 539, 540, 453, 462, 358/450, 444, 530, 2.1; 382/162, 165
See application file for complete search history.

(56) References Cited

U.S. PATENT DOCUMENTS

| 5,034,806 | A | | 7/1991 | Ikeda et al. ................... 358/540 |
|---|---|---|---|---|
| 5,113,251 | A | * | 5/1992 | Ichiyanagi et al. .......... 358/500 |
| 5,465,165 | A | | 11/1995 | Tanio et al. .................. 358/448 |
| 5,504,844 | A | | 4/1996 | Ueda ........................... 358/1.16 |
| 5,506,941 | A | | 4/1996 | Kurumida ................... 358/1.11 |
| 5,522,017 | A | | 5/1996 | Ueda ........................... 358/1.16 |
| 5,585,945 | A | | 12/1996 | Ikeda et al. .................. 358/540 |
| 5,612,717 | A | * | 3/1997 | Leach .......................... 345/593 |
| 5,659,770 | A | | 8/1997 | Yamada ....................... 715/530 |
| 5,774,634 | A | | 6/1998 | Honma et al. ............... 358/1.9 |
| 5,793,351 | A | * | 8/1998 | Leach .......................... 345/683 |
| 5,822,507 | A | | 10/1998 | Uda et al. .................... 358/1.15 |
| 5,844,688 | A | | 12/1998 | Shimizu et al. ............. 358/296 |
| 5,847,850 | A | | 12/1998 | Kadowaki .................... 358/530 |
| 5,949,427 | A | | 9/1999 | Nishikawa et al. .......... 345/431 |
| 5,963,935 | A | * | 10/1999 | Ozbutun et al. ............... 707/3 |
| 5,987,230 | A | | 11/1999 | Shimizu ..................... 358/1.16 |
| 5,995,674 | A | | 11/1999 | Shirasaka ................... 382/256 |

(Continued)

FOREIGN PATENT DOCUMENTS

JP         362061155 A   *   3/1987

*Primary Examiner*—Madeleine A V Nguyen
(74) *Attorney, Agent, or Firm*—Fitzpatrick, Cella, Harper & Scinto

(57) ABSTRACT

Disclosed is an image processing method. According to the present invention, the image processing method, whereby a multi-value bit map development area, in which is stored a multi-value bit map that represents an output image, and a plurality of pattern planes, each of which corresponds to an attribute of an object, are employed to develop a drawing command and to perform a color process, comprises the steps of developing a multi-bit map in the multi-value bit map development area in accordance with a drawing command, determining an attribute for an object by using the drawing command, developing the bit map, which is consonant with the drawing command, in one of the pattern planes that corresponds to the attribute of the object, and controlling a color process for the multi-value bit map in accordance with the bit maps developed in the pattern planes.

6 Claims, 25 Drawing Sheets

U.S. PATENT DOCUMENTS

| | | |
|---|---|---|
| 6,025,929 A | 2/2000 | Nakajima et al. ............ 358/1.9 |
| 6,055,361 A | 4/2000 | Fujita et al. ............... 358/1.15 |
| 6,081,800 A * | 6/2000 | Ozbutun et al. ............... 707/3 |
| 6,301,397 B1 * | 10/2001 | Jankowski et al. ......... 382/296 |
| 6,339,480 B1 | 1/2002 | Yamada et al. .............. 358/1.8 |
| 6,429,871 B1 * | 8/2002 | Katsura et al. ............. 345/501 |
| 6,456,404 B1 | 9/2002 | Furuya et al. .............. 358/523 |
| 6,490,055 B1 * | 12/2002 | Shimizu ..................... 358/1.9 |
| 6,646,759 B1 | 11/2003 | Koga ......................... 358/1.9 |
| 6,714,673 B1 | 3/2004 | Ohta .......................... 382/167 |
| 6,804,016 B2 * | 10/2004 | Hashimoto et al. ........ 358/1.13 |
| 2003/0001850 A1 * | 1/2003 | Katsura et al. ............. 345/503 |

* cited by examiner

FIG. 7

MULTI-VALUE BIT MAP

DESTINATION BIT MAP

R (RED) PLANE

| 0 | 2A | 4E | 33 | 90 | 4A | F0 | 7 | FF | FF | FF | FF | FF | FF | FF | FF |
|---|---|---|---|---|---|---|---|---|---|---|---|---|---|---|---|
| AE | 2F | 9 | F5 | 1F | C9 | AB | 32 | FF | FF | FF | FF | FF | FF | FF | FF |
| 19 | 78 | 4F | E3 | 12 | 80 | FF | 65 | FF | FF | FF | FF | FF | FF | FF | FF |
| 34 | F | 29 | 1A | FA | 4B | 3F | 98 | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |

G (GREEN) PLANE

| 21 | 26 | 63 | 84 | 23 | 24 | 61 | 3C | FF | FF | FF | FF | FF | FF | FF | FF |
|---|---|---|---|---|---|---|---|---|---|---|---|---|---|---|---|
| 98 | 4A | 79 | 23 | 3E | 97 | 38 | 74 | FF | FF | FF | FF | FF | FF | FF | FF |
| A5 | 82 | 40 | 63 | 34 | F4 | 16 | 22 | FF | FF | FF | FF | FF | FF | FF | FF |
| 62 | 28 | 56 | A4 | 55 | 48 | C2 | 95 | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |

B (BLUE) PLANE

| 1E | 90 | 4 | BB | E8 | AA | 82 | 26 | FF | FF | FF | FF | FF | FF | FF | FF |
|---|---|---|---|---|---|---|---|---|---|---|---|---|---|---|---|
| C | A3 | 28 | 72 | EB | 39 | C0 | 64 | FF | FF | FF | FF | FF | FF | FF | FF |
| 2A | 23 | A | B3 | 1C | 40 | 11 | 42 | FF | FF | FF | FF | FF | FF | FF | FF |
| 20 | B0 | 22 | 28 | 12 | 21 | BA | 39 | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |

FIG. 8
SOURCE BIT MAP
R (RED) PLANE
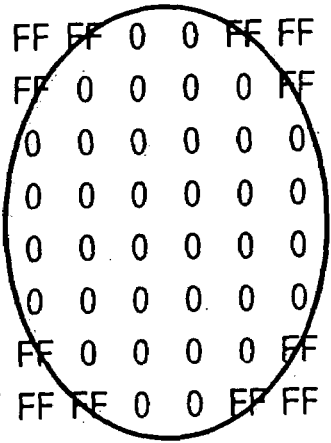
G (GREEN) PLANE
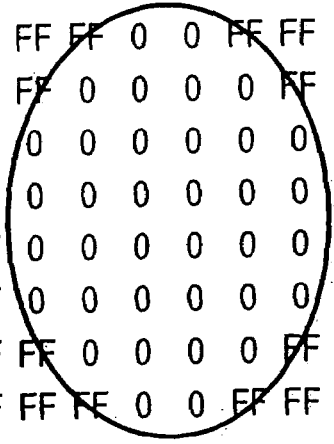
B (BLUE) PLANE
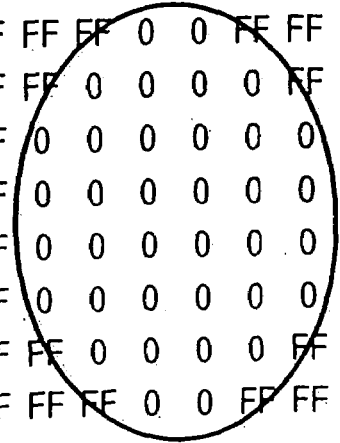

FIG. 9

RESULT 1

R (RED) PLANE

| 0 | 2A | 4E | 33 | 90 | 4A | 50 | 0 | 0 | FF | FF | FF | FF | FF | FF | FF |
|---|---|---|---|---|---|---|---|---|---|---|---|---|---|---|---|
| AE | 2F | 9 | F5 | 1F | C9 | 0 | 0 | 0 | 0 | FF | FF | FF | FF | FF | FF |
| 19 | 78 | 4F | E3 | 12 | 0 | 0 | 0 | 0 | 0 | 0 | FF | FF | FF | FF | FF |
| 34 | F | 29 | 1A | FA | 0 | 0 | 0 | 0 | 0 | 0 | FF | FF | FF | FF | FF |
| FF | FF | FF | FF | FF | 0 | 0 | 0 | 0 | 0 | 0 | FF | FF | FF | FF | FF |
| FF | FF | FF | FF | FF | 0 | 0 | 0 | 0 | 0 | 0 | FF | FF | FF | FF | FF |
| FF | FF | FF | FF | FF | FF | 0 | 0 | 0 | 0 | FF | FF | FF | FF | FF | FF |
| FF | FF | FF | FF | FF | FF | FF | 0 | 0 | FF | FF | FF | FF | FF | FF | FF |

G (GREEN) PLANE

| 21 | 26 | 64 | 84 | 23 | 24 | 61 | 0 | 0 | FF | FF | FF | FF | FF | FF | FF |
|---|---|---|---|---|---|---|---|---|---|---|---|---|---|---|---|
| 98 | 4A | 79 | 23 | 3E | 97 | 0 | 0 | 0 | 0 | FF | FF | FF | FF | FF | FF |
| A5 | 82 | 40 | 63 | 34 | 0 | 0 | 0 | 0 | 0 | 0 | FF | FF | FF | FF | FF |
| 62 | 28 | 56 | A4 | 55 | 0 | 0 | 0 | 0 | 0 | 0 | FF | FF | FF | FF | FF |
| FF | FF | FF | FF | FF | 0 | 0 | 0 | 0 | 0 | 0 | FF | FF | FF | FF | FF |
| FF | FF | FF | FF | FF | 0 | 0 | 0 | 0 | 0 | 0 | FF | FF | FF | FF | FF |
| FF | FF | FF | FF | FF | FF | 0 | 0 | 0 | 0 | FF | FF | FF | FF | FF | FF |
| FF | FF | FF | FF | FF | FF | FF | 0 | 0 | FF | FF | FF | FF | FF | FF | FF |

B (BLUE) PLANE

| 1E | 90 | 4 | BB | E8 | AA | 82 | 0 | 0 | FF | FF | FF | FF | FF | FF | FF |
|---|---|---|---|---|---|---|---|---|---|---|---|---|---|---|---|
| C | A3 | 28 | 72 | EB | 39 | 0 | 0 | 0 | 0 | FF | FF | FF | FF | FF | FF |
| 2A | 23 | A | B3 | 1C | 0 | 0 | 0 | 0 | 0 | 0 | FF | FF | FF | FF | FF |
| 20 | B0 | 22 | 28 | 12 | 0 | 0 | 0 | 0 | 0 | 0 | FF | FF | FF | FF | FF |
| FF | FF | FF | FF | FF | 0 | 0 | 0 | 0 | 0 | 0 | FF | FF | FF | FF | FF |
| FF | FF | FF | FF | FF | 0 | 0 | 0 | 0 | 0 | 0 | FF | FF | FF | FF | FF |
| FF | FF | FF | FF | FF | FF | 0 | 0 | 0 | 0 | FF | FF | FF | FF | FF | FF |
| FF | FF | FF | FF | FF | FF | FF | 0 | 0 | FF | FF | FF | FF | FF | FF | FF |

FIG. 10

SOURCE BIT MAP
R (RED) PLANE

```
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
```

G (GREEN) PLANE

```
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
```

B (BLUE) PLANE

RESULT 2

R (RED) PLANE

| 0 | 2A | 4E | 33 | 90 | 4A | F0 | 0 | 0 | FF | FF | FF | FF | FF | FF | FF |
|---|---|---|---|---|---|---|---|---|---|---|---|---|---|---|---|
| AE | 2F | 9 | F5 | 1F | C9 | 0 | 0 | 0 | 0 | FF | FF | FF | FF | FF | FF |
| 19 | 78 | 4F | E3 | 12 | 0 | 0 | 0 | 0 | 0 | 0 | FF | FF | FF | FF | FF |
| 34 | F | 29 | 1A | FA | 0 | 0 | 0 | 0 | 0 | 0 | FF | FF | FF | FF | FF |
| FF | FF | FF | FF | FF | 0 | 0 | 0 | 0 | 0 | 0 | FF | FF | FF | FF | FF |
| FF | FF | FF | FF | FF | 0 | 0 | 0 | 0 | 0 | 0 | FF | FF | FF | FF | FF |
| FF | FF | FF | FF | FF | FF | 0 | 0 | 0 | 0 | FF | FF | FF | FF | FF | FF |
| FF | FF | FF | FF | FF | FF | FF | 0 | 0 | FF | FF | FF | FF | FF | FF | FF |

G (GREEN) PLANE

| 21 | 26 | 64 | 84 | 23 | 24 | 61 | 0 | 0 | FF | FF | FF | FF | FF | FF | FF |
|---|---|---|---|---|---|---|---|---|---|---|---|---|---|---|---|
| 98 | 4A | 79 | 23 | 3E | 97 | 0 | 0 | 0 | 0 | FF | FF | FF | FF | FF | FF |
| A5 | 82 | 40 | 63 | 34 | 0 | 0 | 0 | 0 | 0 | 0 | FF | FF | FF | FF | FF |
| 62 | 28 | 56 | A4 | 55 | 0 | 0 | 0 | 0 | 0 | 0 | FF | FF | FF | FF | FF |
| FF | FF | FF | FF | FF | 0 | 0 | 0 | 0 | 0 | 0 | FF | FF | FF | FF | FF |
| FF | FF | FF | FF | FF | 0 | 0 | 0 | 0 | 0 | 0 | FF | FF | FF | FF | FF |
| FF | FF | FF | FF | FF | FF | 0 | 0 | 0 | 0 | FF | FF | FF | FF | FF | FF |
| FF | FF | FF | FF | FF | FF | FF | 0 | 0 | FF | FF | FF | FF | FF | FF | FF |

B (BLUE) PLANE

| 1E | 90 | 4 | BB | E8 | AA | 82 | FF | FF | FF | FF | FF | FF | FF | FF | FF |
|---|---|---|---|---|---|---|---|---|---|---|---|---|---|---|---|
| C | A3 | 28 | 72 | EB | 39 | FF | FF | FF | FF | FF | FF | FF | FF | FF | FF |
| 2A | 23 | A | B3 | 1C | FF | FF | FF | FF | FF | FF | FF | FF | FF | FF | FF |
| 20 | B0 | 22 | 28 | 12 | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |

FIG. 12

AREA JUDGING PLANE

DESTINATION BIT MAP
GRAPHICS (RED) PLANE

| 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

TEXT (GREEN) PLANE

| 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

IMAGE (BLUE) PLANE

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

FIG. 13

SOURCE BIT MAP
GRAPHICS (RED) PLANE

```
1 1 1 1 1 1 0 0 1 1 1 1 1 1
1 1 1 1 1 1 0 0 0 0 1 1 1 1 1
1 1 1 1 1 0 0 0 0 0 0 1 1 1 1
1 1 1 1 1 0 0 0 0 0 0 1 1 1 1
1 1 1 1 1 0 0 0 0 0 0 1 1 1 1
1 1 1 1 1 0 0 0 0 0 0 1 1 1 1
1 1 1 1 1 1 0 0 0 0 1 1 1 1 1
1 1 1 1 1 1 1 0 0 1 1 1 1 1 1
```

TEXT (GREEN) PLANE

```
1 1 1 1 1 1 0 0 1 1 1 1 1 1
1 1 1 1 1 1 0 0 0 0 1 1 1 1 1
1 1 1 1 1 0 0 0 0 0 0 1 1 1 1
1 1 1 1 1 0 0 0 0 0 0 1 1 1 1
1 1 1 1 1 0 0 0 0 0 0 1 1 1 1
1 1 1 1 1 0 0 0 0 0 0 1 1 1 1
1 1 1 1 1 1 0 0 0 0 1 1 1 1 1
1 1 1 1 1 1 1 0 0 1 1 1 1 1 1
```

IMAGE (BLUE) PLANE

RESULT 1

GRAPHICS (RED) PLANE

| 0 | 0 | 0 | 0 | 0 | 0 | 0 | 0 | 0 | 1 | 1 | 1 | 1 | 1 | 1 |
|---|---|---|---|---|---|---|---|---|---|---|---|---|---|---|
| 0 | 0 | 0 | 0 | 0 | 0 | 0 | 0 | 0 | 0 | 1 | 1 | 1 | 1 | 1 |
| 0 | 0 | 0 | 0 | 0 | 0 | 0 | 0 | 0 | 0 | 0 | 1 | 1 | 1 | 1 |
| 0 | 0 | 0 | 0 | 0 | 0 | 0 | 0 | 0 | 0 | 0 | 1 | 1 | 1 | 1 |
| 1 | 1 | 1 | 1 | 1 | 0 | 0 | 0 | 0 | 0 | 0 | 1 | 1 | 1 | 1 |
| 1 | 1 | 1 | 1 | 1 | 0 | 0 | 0 | 0 | 0 | 0 | 1 | 1 | 1 | 1 |
| 1 | 1 | 1 | 1 | 1 | 1 | 0 | 0 | 0 | 0 | 1 | 1 | 1 | 1 | 1 |
| 1 | 1 | 1 | 1 | 1 | 1 | 1 | 0 | 0 | 1 | 1 | 1 | 1 | 1 | 1 |

TEXT (GREEN) PLANE

| 0 | 0 | 0 | 0 | 0 | 0 | 0 | 0 | 0 | 1 | 1 | 1 | 1 | 1 | 1 |
|---|---|---|---|---|---|---|---|---|---|---|---|---|---|---|
| 0 | 0 | 0 | 0 | 0 | 0 | 0 | 0 | 0 | 0 | 1 | 1 | 1 | 1 | 1 |
| 0 | 0 | 0 | 0 | 0 | 0 | 0 | 0 | 0 | 0 | 0 | 1 | 1 | 1 | 1 |
| 0 | 0 | 0 | 0 | 0 | 0 | 0 | 0 | 0 | 0 | 0 | 1 | 1 | 1 | 1 |
| 1 | 1 | 1 | 1 | 1 | 0 | 0 | 0 | 0 | 0 | 0 | 1 | 1 | 1 | 1 |
| 1 | 1 | 1 | 1 | 1 | 0 | 0 | 0 | 0 | 0 | 0 | 1 | 1 | 1 | 1 |
| 1 | 1 | 1 | 1 | 1 | 1 | 0 | 0 | 0 | 0 | 1 | 1 | 1 | 1 | 1 |
| 1 | 1 | 1 | 1 | 1 | 1 | 1 | 0 | 0 | 1 | 1 | 1 | 1 | 1 | 1 |

IMAGE (BLUE) PLANE

| 1 | 1 | 1 | 1 | 1 | 1 | 1 | 0 | 0 | 1 | 1 | 1 | 1 | 1 | 1 |
|---|---|---|---|---|---|---|---|---|---|---|---|---|---|---|
| 1 | 1 | 1 | 1 | 1 | 1 | 0 | 0 | 0 | 0 | 1 | 1 | 1 | 1 | 1 |
| 1 | 1 | 1 | 1 | 1 | 0 | 0 | 0 | 0 | 0 | 0 | 1 | 1 | 1 | 1 |
| 1 | 1 | 1 | 1 | 1 | 0 | 0 | 0 | 0 | 0 | 0 | 1 | 1 | 1 | 1 |
| 1 | 1 | 1 | 1 | 1 | 0 | 0 | 0 | 0 | 0 | 0 | 1 | 1 | 1 | 1 |
| 1 | 1 | 1 | 1 | 1 | 0 | 0 | 0 | 0 | 0 | 0 | 1 | 1 | 1 | 1 |
| 1 | 1 | 1 | 1 | 1 | 1 | 0 | 0 | 0 | 0 | 1 | 1 | 1 | 1 | 1 |
| 1 | 1 | 1 | 1 | 1 | 1 | 1 | 0 | 0 | 1 | 1 | 1 | 1 | 1 | 1 |

FIG. 15

SOURCE BIT MAP
GRAPHICS (RED) PLANE

```
0  0  0  0  0  0  0  1  1  0  0  0  0  0  0
0  0  0  0  0  0  1  1  1  1  0  0  0  0  0
0  0  0  0  0  1  1  1  1  1  1  0  0  0  0
0  0  0  0  0  1  1  1  1  1  1  0  0  0  0
0  0  0  0  0  1  1  1  1  1  1  0  0  0  0
0  0  0  0  0  1  1  1  1  1  1  0  0  0  0
0  0  0  0  0  0  1  1  1  1  0  0  0  0  0
0  0  0  0  0  0  0  1  1  0  0  0  0  0  0
```

TEXT (GREEN) PLANE

```
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
```

IMAGE (BLUE) PLANE

RESULT 2

GRAPHICS (RED) PLANE

| 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|
| 0 | 0 | 0 | 0 | 0 | 0 | 1 | 1 | 1 | 1 | 1 | 1 | 1 | 1 | 1 |
| 0 | 0 | 0 | 0 | 0 | 1 | 1 | 1 | 1 | 1 | 1 | 1 | 1 | 1 | 1 |
| 0 | 0 | 0 | 0 | 0 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |

TEXT (GREEN) PLANE

| 0 | 0 | 0 | 0 | 0 | 0 | 0 | 0 | 0 | 1 | 1 | 1 | 1 | 1 | 1 |
|---|---|---|---|---|---|---|---|---|---|---|---|---|---|---|
| 0 | 0 | 0 | 0 | 0 | 0 | 0 | 0 | 0 | 0 | 1 | 1 | 1 | 1 | 1 |
| 0 | 0 | 0 | 0 | 0 | 0 | 0 | 0 | 0 | 0 | 1 | 1 | 1 | 1 | 1 |
| 0 | 0 | 0 | 0 | 0 | 0 | 0 | 0 | 0 | 0 | 1 | 1 | 1 | 1 | 1 |
| 1 | 1 | 1 | 1 | 1 | 0 | 0 | 0 | 0 | 0 | 1 | 1 | 1 | 1 | 1 |
| 1 | 1 | 1 | 1 | 1 | 0 | 0 | 0 | 0 | 0 | 1 | 1 | 1 | 1 | 1 |
| 1 | 1 | 1 | 1 | 1 | 0 | 0 | 0 | 0 | 1 | 1 | 1 | 1 | 1 | 1 |
| 1 | 1 | 1 | 1 | 1 | 1 | 0 | 0 | 1 | 1 | 1 | 1 | 1 | 1 | 1 |

IMAGE (BLUE) PLANE

| 1 | 1 | 1 | 1 | 1 | 1 | 1 | 0 | 0 | 1 | 1 | 1 | 1 | 1 | 1 |
|---|---|---|---|---|---|---|---|---|---|---|---|---|---|---|
| 1 | 1 | 1 | 1 | 1 | 1 | 0 | 0 | 0 | 0 | 1 | 1 | 1 | 1 | 1 |
| 1 | 1 | 1 | 1 | 1 | 0 | 0 | 0 | 0 | 0 | 1 | 1 | 1 | 1 | 1 |
| 1 | 1 | 1 | 1 | 1 | 0 | 0 | 0 | 0 | 0 | 1 | 1 | 1 | 1 | 1 |
| 1 | 1 | 1 | 1 | 1 | 0 | 0 | 0 | 0 | 0 | 1 | 1 | 1 | 1 | 1 |
| 1 | 1 | 1 | 1 | 1 | 0 | 0 | 0 | 0 | 0 | 1 | 1 | 1 | 1 | 1 |
| 1 | 1 | 1 | 1 | 1 | 0 | 0 | 0 | 0 | 1 | 1 | 1 | 1 | 1 | 1 |
| 1 | 1 | 1 | 1 | 1 | 1 | 0 | 0 | 1 | 1 | 1 | 1 | 1 | 1 | 1 |

FIG. 17

Y COORDINATE 0

GRAPHICS (RED) PLANE
0 0 0 0 0 0 0 1 1 1 1 1 1 1 1

TEXT (GREEN) PLANE
0 0 0 0 0 0 0 0 0 1 1 1 1 1 1

IMAGE (BLUE) PLANE
1 1 1 1 1 1 1 0 0 1 1 1 1 1 1

ALL LOGICAL MULTIPLICATION (17-1)
0 0 0 0 0 0 0 0 0 1 1 1 1 1 1

LOGICAL MULTIPLICATION OF IMAGE OF TEXT AND
LOGICAL ADDITION OF GRAPHICS (17-2)
0 0 0 0 0 0 0 1 1 1 1 1 1 1 1

COORDINATE TO BE FETCHED OUT

Y COORDINATE 0

MULTI-VALUE BIT MAP (RGB)
R : 0 2A 4E 33 90 4A F0 0 0 FF FF FF FF FF FF FF
G : 21 26 64 84 23 24 61 0 0 FF FF FF FF FF FF FF
B : 1E 90 4 BB E8 AA 82 FF FF FF FF FF FF FF FF FF

GRAPHICS     (17-4)
0 0 0 0 0 0 0 1 1 0 0 0 0 0 0

TEXT     (17-5)
0 0 0 0 0 0 0 0 0 0 0 0 0 0 0

IMAGE     (17-6)
1 1 1 1 1 1 1 0 0 0 0 0 0 0 0

FIG. 23
MULTI-VALUE BIT MAP (24 BITS)
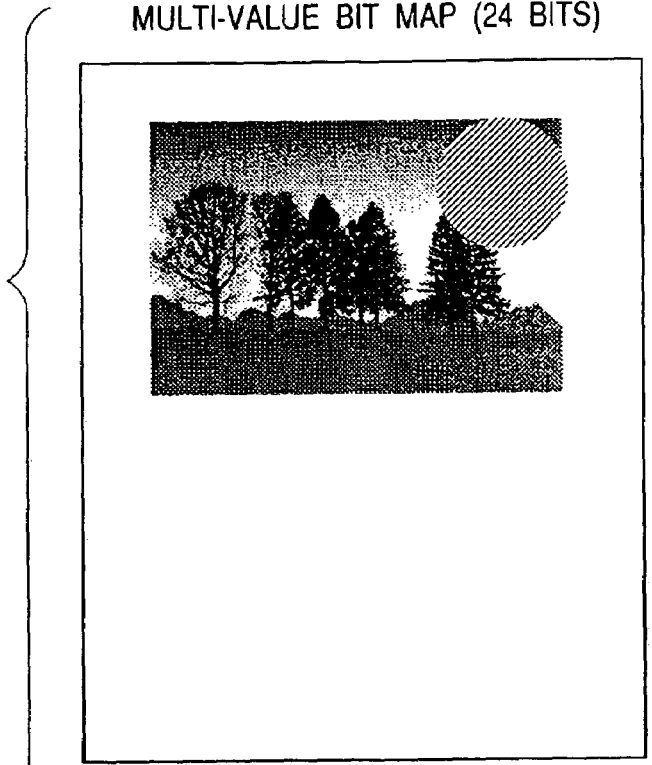
(A) IMAGE BIT MAP
(B) MASK BIT MAP
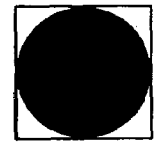
(C) GRADATION BIT MAP
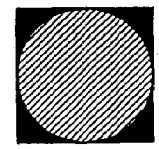
STEP 1. COPY IMAGE BIT MAP
↓
STEP 2. DRAW MASK BIT BY LOGICAL ADDITION
↓
STEP 3. DRAW GRADATION BIT MAP BY LOGICAL ADDITION

FIG. 24
WHEN BLACK DATA IS REFLECTED
BIT MAP FOR DISCRIMINATING OBJECT (ONE BIT)
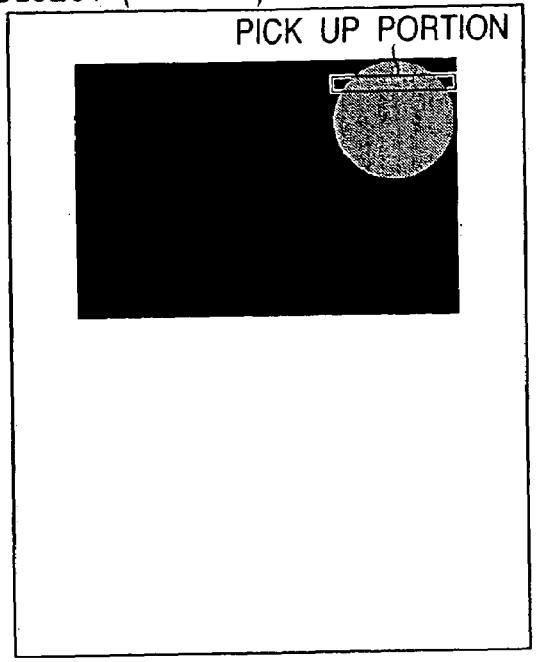
(A) IMAGE BIT MAP
(B) MASK BIT MAP
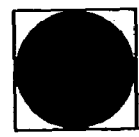
(C) GRADATION BIT MAP
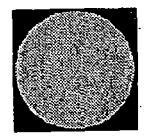
STEP 1. COPY IMAGE BIT MAP
GRAPHICS (RED)
0 0 0 0 0 0 0 0 0 0 0 0 0 0 0 0
TEXT (GREEN)
0 0 0 0 0 0 0 0 0 0 0 0 0 0 0 0
IMAGE (BLUE)
1 1 1 1 1 1 1 1 1 1 1 1 1 1 1 1
STEP 2. DRAW MASK BIT BY LOGICAL ADDITION
GRAPHICS (RED)
0 0 0 0 0 0 0 0 0 0 0 0 0 0 0 0
TEXT (GREEN)
0 0 0 0 0 0 0 0 0 0 0 0 0 0 0 0
IMAGE (BLUE)
1 1 1 1 0 0 0 0 0 0 0 0 1 1 1 1
STEP 3. DRAW GRADATION BIT MAP BY LOGICAL ADDITION
GRAPHICS (RED)
0 0 0 0 1 1 1 1 1 1 1 1 0 0 0 0
TEXT (GREEN)
0 0 0 0 0 0 0 0 0 0 0 0 0 0 0 0
IMAGE (BLUE)
1 1 1 1 0 0 0 0 0 0 0 0 1 1 1 1

FIG. 25
WHEN BLACK DATA IS NOT REFLECTED
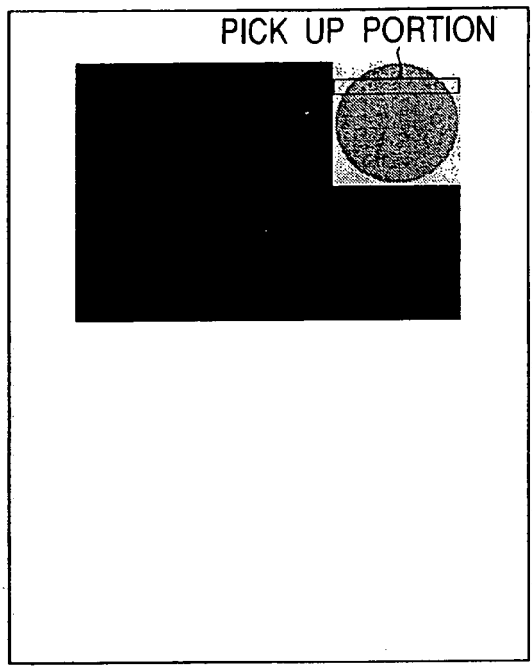
(A) IMAGE BIT MAP
(B) MASK BIT MAP
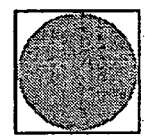
(C) GRADATION BIT MAP
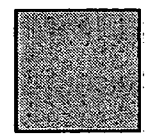
STEP 1. COPY IMAGE BIT MAP
GRAPHICS (RED)
0 0 0 0 0 0 0 0 0 0 0 0 0 0 0 0
TEXT (GREEN)
0 0 0 0 0 0 0 0 0 0 0 0 0 0 0 0
IMAGE (BLUE)
1 1 1 1 1 1 1 1 1 1 1 1 1 1 1 1
↓
STEP 2. DRAW MASK BIT BY LOGICAL ADDITION
GRAPHICS (RED)
0 0 0 0 0 0 0 0 0 0 0 0 0 0 0 0
TEXT (GREEN)
0 0 0 0 0 0 0 0 0 0 0 0 0 0 0 0
IMAGE (BLUE)
1 1 1 1 0 0 0 0 0 0 0 0 1 1 1 1
↓
STEP 3. DRAW GRADATION BIT MAP BY LOGICAL ADDITION
GRAPHICS (RED)
1 1 1 1 1 1 1 1 1 1 1 1 1 1 1 1
TEXT (GREEN)
0 0 0 0 0 0 0 0 0 0 0 0 0 0 0 0
IMAGE (BLUE)
1 1 1 1 0 0 0 0 0 0 0 0 1 1 1 1

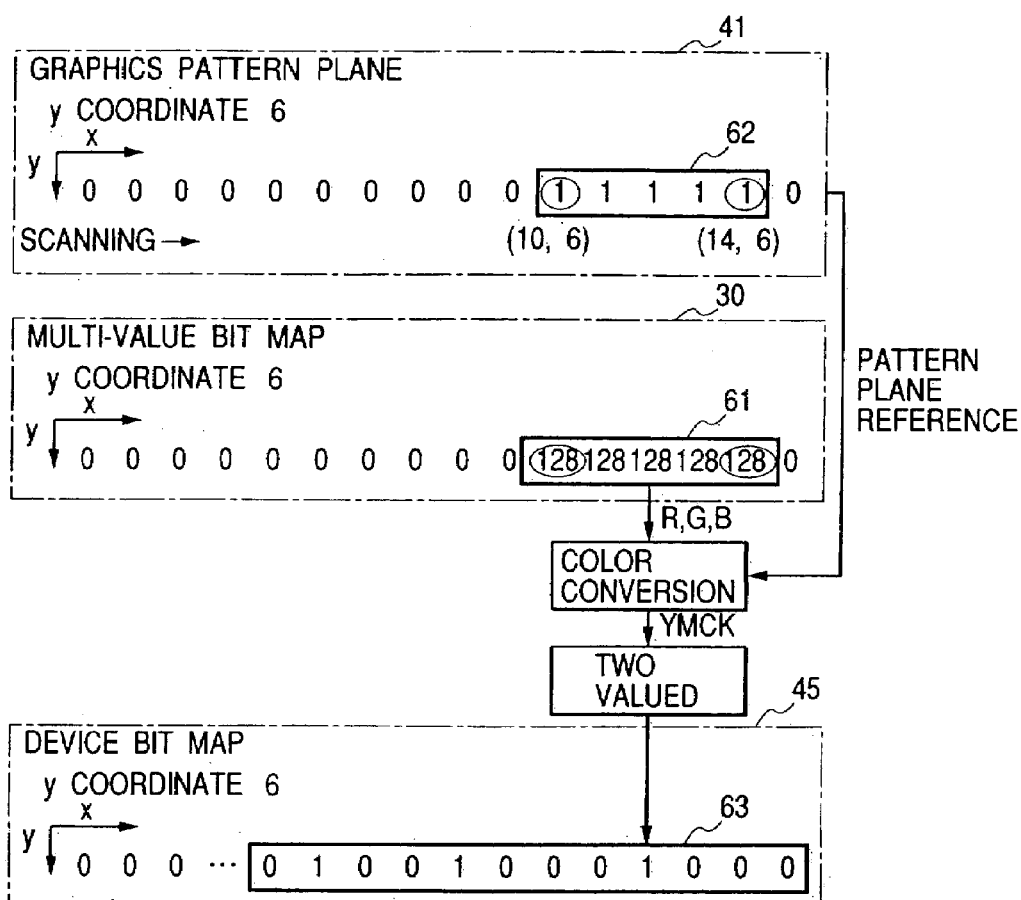

IMAGE PROCESSING METHOD AND APPARATUS, AND STORAGE MEDIUM THEREFORE

RELATED APPLICATION

This application is a divisional of application Ser. No. 09/571,153, filed May 16, 2000, now U.S. Pat. No. 6,853,465 the entire contents of which are incorporated herein by reference.

BACKGROUND OF THE INVENTION

1. Field of the Invention

The present invention relates to an image processing method and an apparatus for developing a drawing command and for performing a color process corresponding to the attribute of an object, and to a storage medium therefor.

2. Related Background Art

Conventionally, upon receiving a drawing command from an OS, a driver develops bits in a multi-value bit map area, and after all the drawing commands have been processed, performs a color process, such as color correction, color conversion or binarization (an n-value transformation), for the multi-value bit map area. Therefore, a color process for each object can not be performed.

Further, conventionally, there is a driver that has a unique logical calculation function. This driver performs a color process, such as color correction, color conversion or binarization (an n-value transformation), and then, to perform a color process for each object, writes density data directly to a device.

Although a conventional driver, which can perform a color process for each object, has a unique logical calculation function, when UCR (Under Color Removal) is employed to perform a logical calculation, the resultant output is incorrect. And even when, to avoid this, the UCR is invalidated, a preferable output can not be obtained.

Since, however, the capabilities of printers have been improved, there printers whose minimum output units are multi-values. But since to cope with neutral tints a conventional driver that performs a color process for each object must prepare a brush object for each drawing command, a load is imposed on the n-value portion of the brush for the preparation of multi-value data, so that a drastic deterioration of the processing speed occurs.

SUMMARY OF THE INVENTION

To resolve the above shortcoming, it is one objective of the present invention to provide an image processing method and apparatus, and a storage medium therefor.

It is another objective of the present invention to very precisely determine the attribute of an object.

To achieve these objectives, according to the present invention, an image processing method for executing a development process of drawing command and a color process by using a multi-value bit map development area in which a multi-value bit map representing an output image is stored and a plurality of pattern planes each corresponding to an attribute of an object, the method comprises the steps of:

developing a multi-bit map in the multi-value bit map development area in accordance with a drawing command;

determining an attribute for an object by using the drawing command;

developing the bit map corresponding to the drawing command, in the pattern plane corresponding to the attribute of the object; and controlling a color process for the multi-value bit map in accordance with the bit maps of the pattern planes.

Further, according to the image processing method of the present invention, to achieve the above objectives for a black graphic object, a bit map is developed for the pattern planes for the text, the image and the graphic object.

Other features and advantages of the invention will become apparent in the course of the following description, given while referring to the accompanying drawings, throughout which the same reference characters are employed to designate like or similar parts.

BRIEF DESCRIPTION OF THE DRAWINGS

FIG. 7 is a conceptual diagram showing a process whereby a bit map is drawn in a multi-value bit map through a logical calculation performed for a black masking process;

FIG. 8 is a conceptual diagram showing a process whereby a bit map is drawn in a multi-value bit map through a logical calculation performed for a black masking process;

FIG. 9 is a conceptual diagram showing a process whereby a bit map is drawn in a multi-value bit map through a logical calculation performed for a black masking process;

Figure 10:
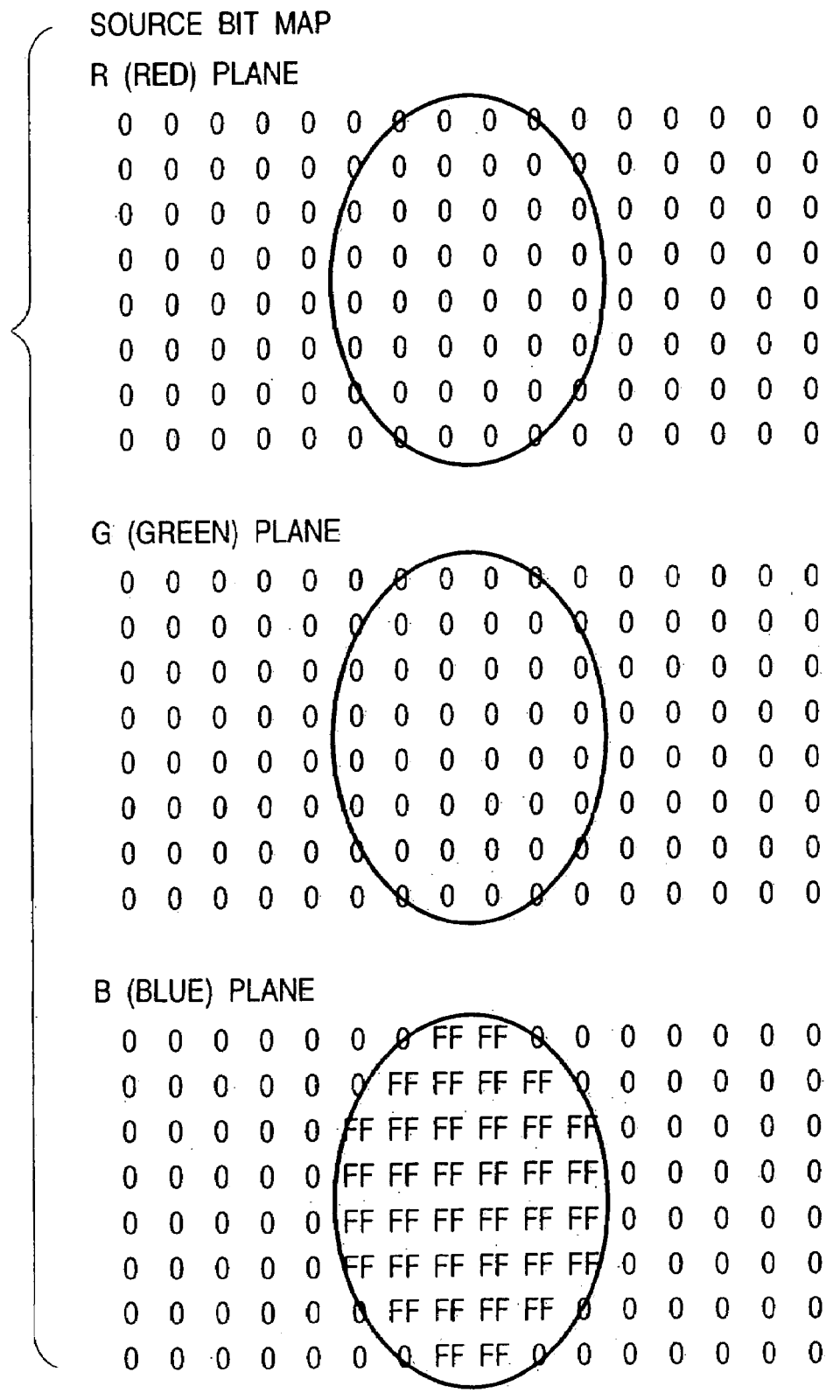

FIG. 10 is a conceptual diagram showing a process whereby a bit map is drawn in a multi-value bit map through a logical calculation performed for a black masking process;

FIG. 11 is a conceptual diagram showing a process whereby a bit map is drawn in a multi-value bit map through a logical calculation performed for a black masking process;

FIG. 12 is a conceptual diagram showing a process whereby a bit map is drawn in pattern planes to determine an object through a logical calculation performed for a black masking process;

FIG. 13 is a conceptual diagram showing a process whereby a bit map is drawn in pattern planes to determine an object through a logical calculation performed for a black masking process;

FIG. 14 is a conceptual diagram showing a process whereby a bit map is drawn in pattern planes to determine an object through a logical calculation performed for a black masking process;

FIG. 15 is a conceptual diagram showing a process whereby a bit map is drawn in pattern planes to determine an object through a logical calculation performed for a black masking process;

FIG. 16 is a conceptual diagram showing a process whereby a bit map is drawn in pattern plane to determine an object through a logical calculation performed for a black masking process;

FIG. 17 is a diagram showing the results of a process, which employs the results obtained for pattern planes, to determine coordinates at which data for a multi-value bit map constitutes a target for the color process for each object;

FIG. 23 is a diagram showing an example drawing command;

FIG. 24 is a diagram for explaining a change in a pattern plane when the drawing command in FIG. 23 is processed while black data are reflected thereon;

FIG. 25 is a diagram for explaining a change in a pattern plane when the drawing command in FIG. 23 is processed while black data are not reflected thereon;

FIG. 27 is a diagram showing the process for scanning a pattern plane, and for preparing a device bit map from a multi-value bit map; and FIG. 28 is a diagram for explaining the structure of a table in which coordinate sets are stored.

DETAILED DESCRIPTION OF THE PREFERRED EMBODIMENTS

The preferred embodiments of the present invention will now be described in detail while referring to the accompanying drawings.

(Embodiment 1)

Figure 1:
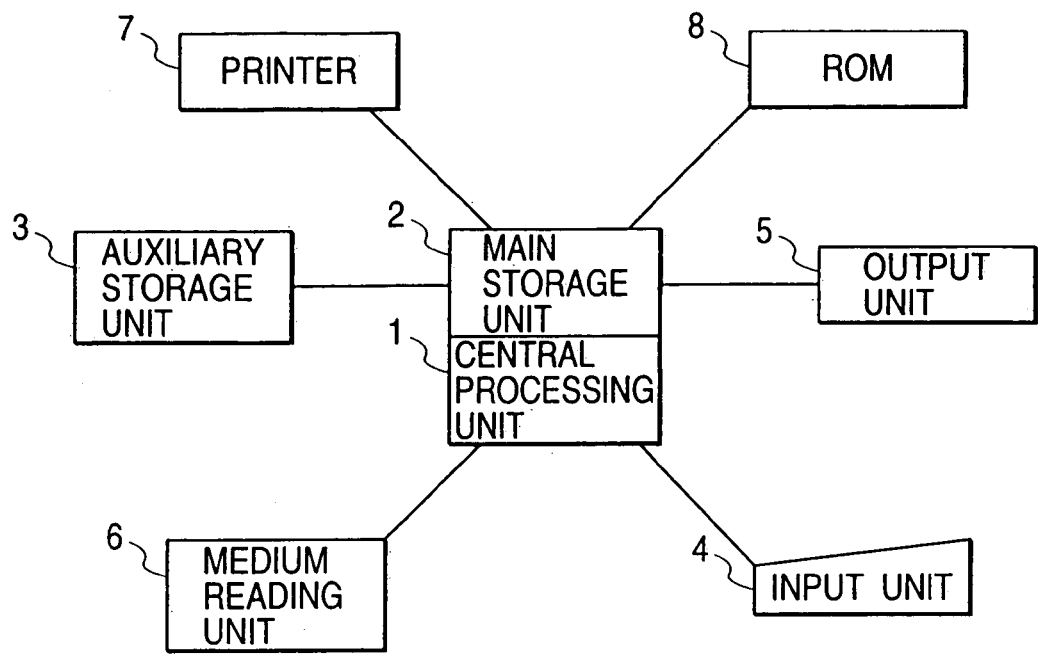
FIG. 1 is a block diagram illustrating an example arrangement for an information processing system.

FIG. 1 is a block diagram illustrating an example arrangement for an information processing system for which an image processing/printing method according to a first embodiment of the present invention is employed.

A central processing unit 1 employs a system program and an application program to process image data entered by an input unit 4, and outputs the resultant data to an output unit 5 or to a printer 7. It should be noted that the system program and the application program are loaded into a main storage unit 2 via an auxiliary storage unit 3 from a medium reading unit 6, for which a storage medium, such as an FD, a CD-ROM or an IC memory card on which an image processing control program (driver) and associated data are stored, is connected to the system. In this embodiment, the output unit 5 is a display device, which is different from the printer 7.

The input unit 4 is a keyboard or a pointing device. The auxiliary storage unit 3 may be a hard disk or a magneto-optical disk, or may be a combination of these media. The individual devices may be connected together across a network.

Figure 2:
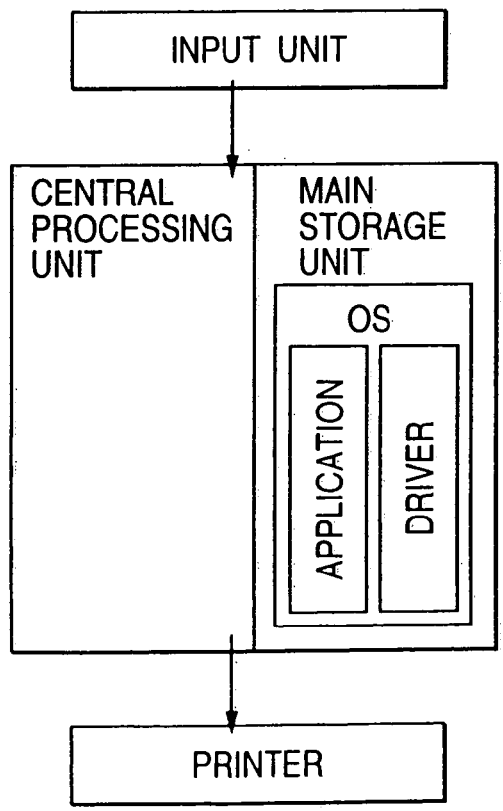
FIG. 2 is a conceptual diagram showing a process during which data, which is associated with an image processing control program and which is stored in the storage device of a medium reading unit, is read by a central processing unit and a print command is input by an input unit for the transmission of data to a printer.

FIG. 2 is a conceptual diagram showing the process during which the image processing control program and the associated data, which are stored in the storage device of the medium reading unit 6, are read by the central processing unit 1, and a print command is entered by the input unit 4 to initiate the transmission of data to the printer 7. Both the application and the driver function under the control of an OS.

Figure 3:
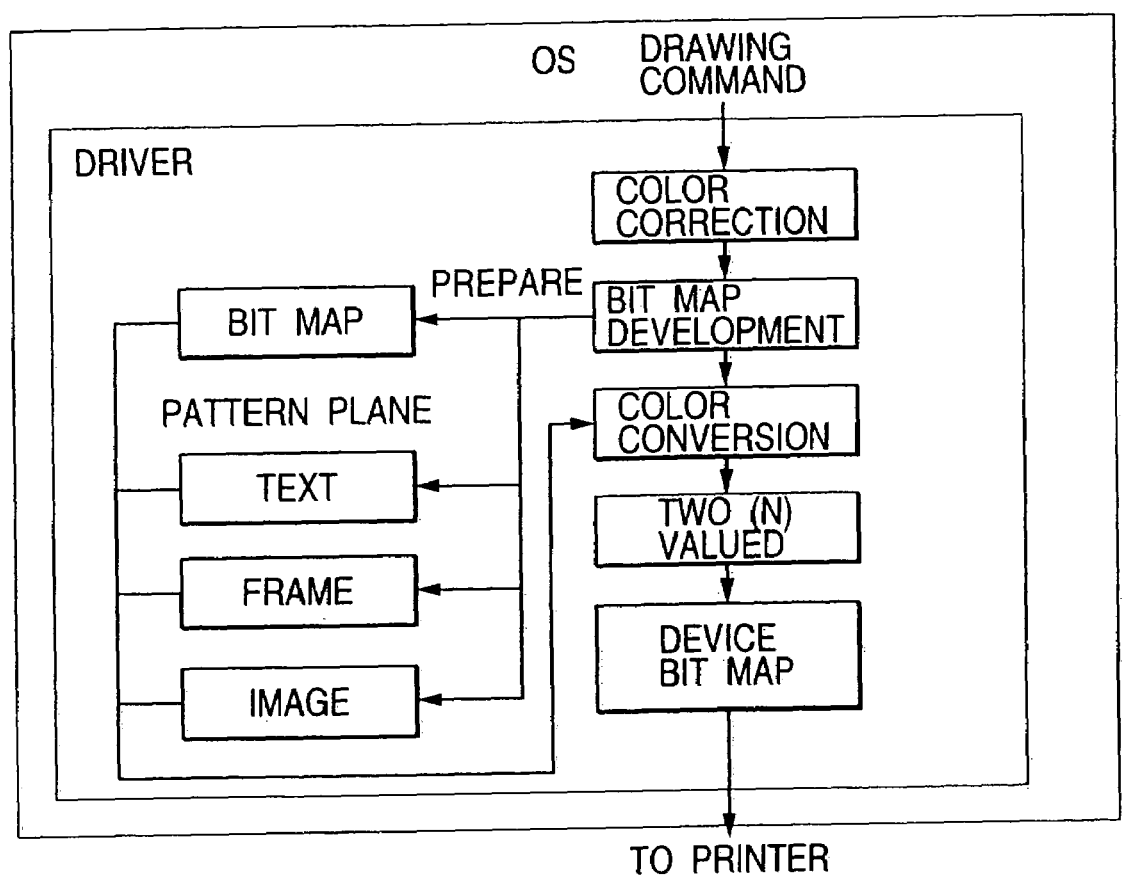
FIG. 3 is a diagram showing the processing contents held by the driver in FIG. 2.

FIG. 3 is a diagram for explaining the processing performed by the driver in FIG. 2. When a drawing command is received from the OS, color correction is performed for multi-value color data that are included in the drawing command. The obtained color data are then used to perform the development process, and a multi-value bit map image is generated. At the same time as the color data are being developed to generate the bit map, the attribute of a drawing command is identified, and a flag bit is set for a pattern plane that corresponds to the attribute.

Then, while referring to the pattern plane, color conversion, which is consonant with the attribute of an object, is performed for the obtained multi-value bit map, and the resultant bit map is binarized (n-valued) to obtain a device bit map. When the processing has been completed for the overall image, the device bit map is transmitted to the printer. Color correction may be performed either before or after the color data have been used to generate the bit map.

In this embodiment, assuming that a graphic plane is red, a text plane is green and an image plane is blue, the three bit RGB development function is employed to perform the writing of data to the individual planes. During the initialization process, white data are written to the multi-value bit map and to all the pattern planes.

Figure 4:
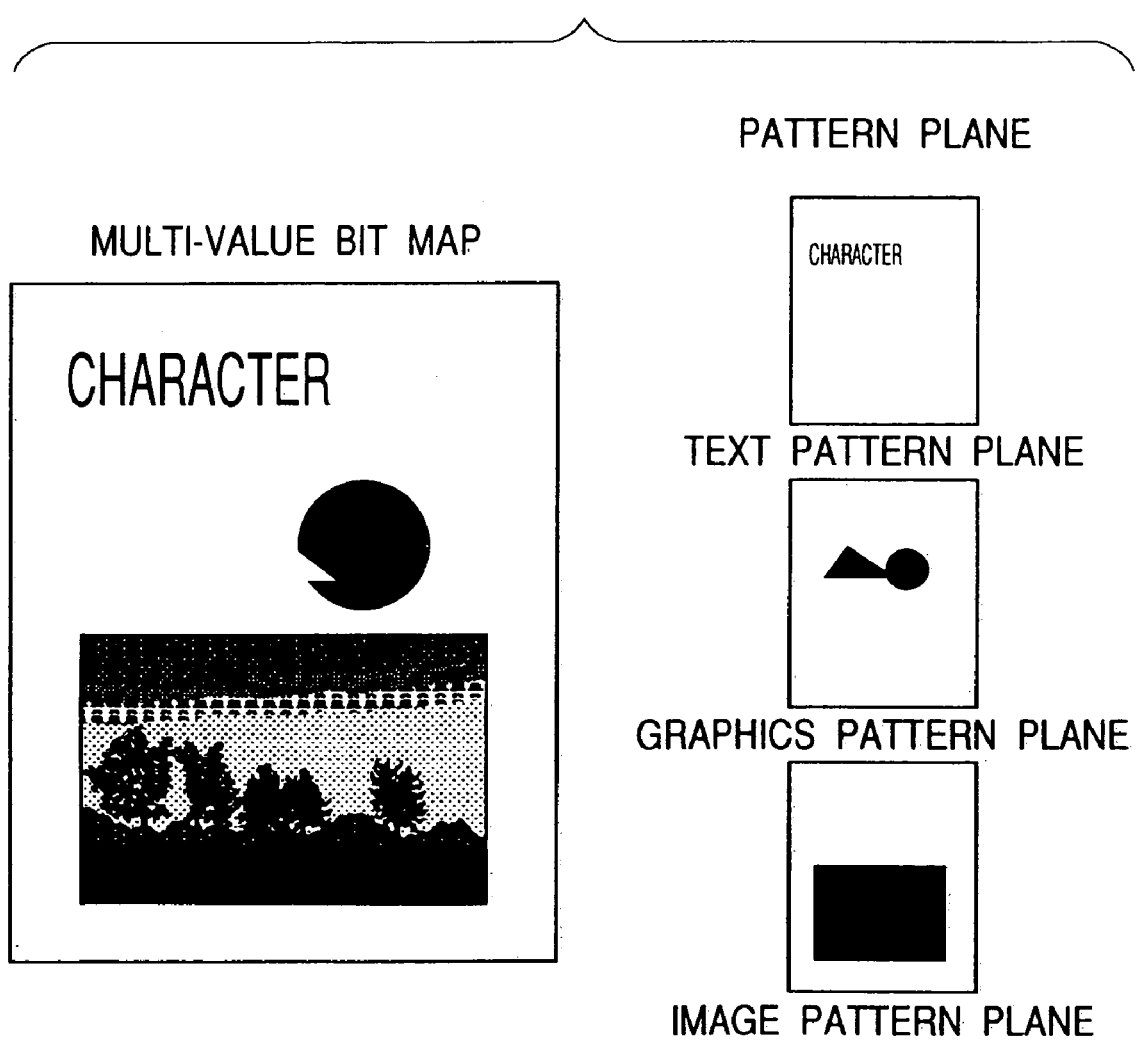
FIG. 4 is a diagram showing a multi-value bit map and pattern planes.

FIG. 4 is a diagram for explaining an ideal pattern plane that is generated for each object when data are developed to produce a multi-value bit map. In each pattern plane, bits are set only for an object having the same attribute at the same coordinates as in the multi-value bit map.

Figure 5:
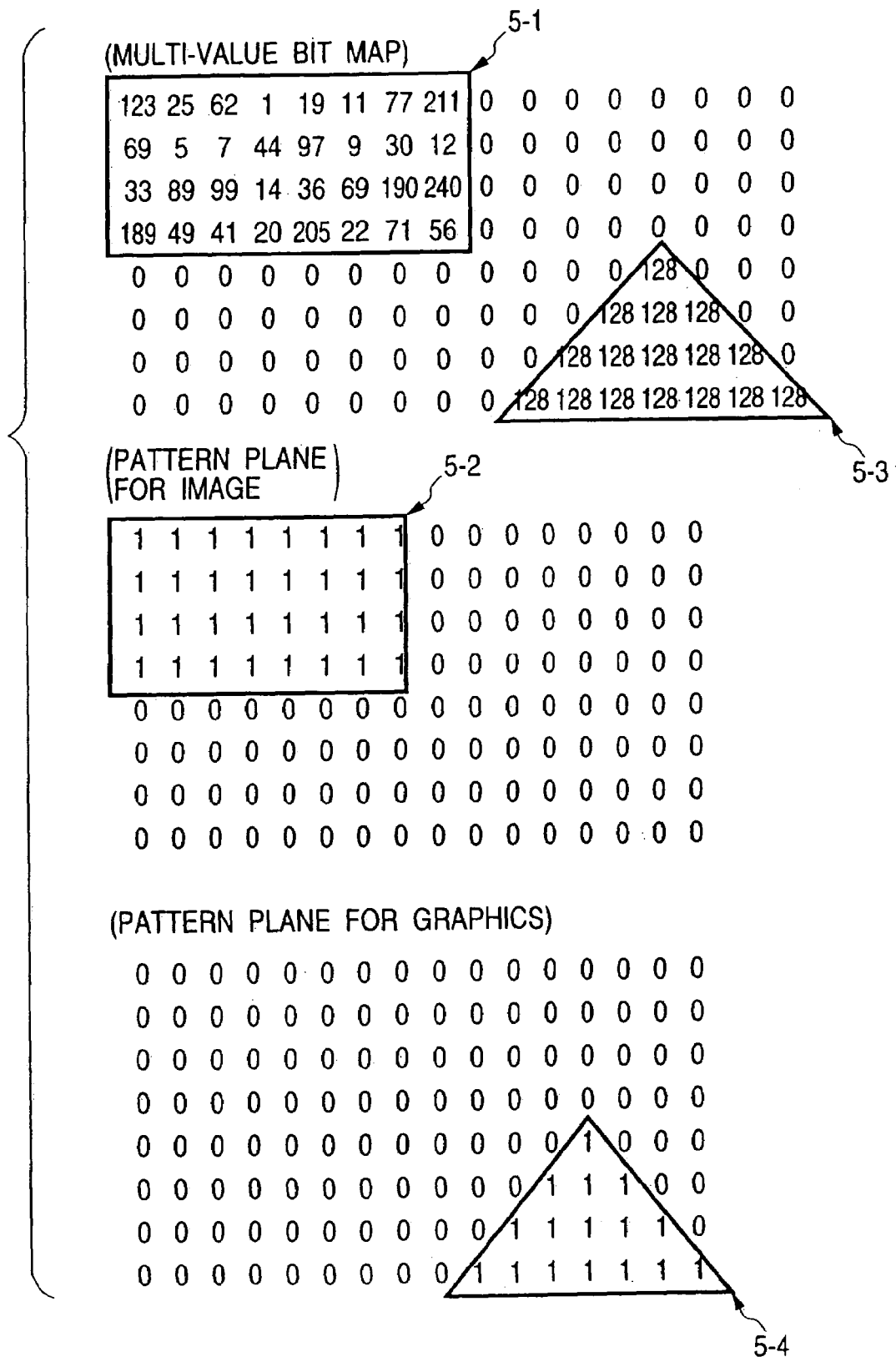
FIG. 5 is a diagram showing multi-value bit maps and pattern plane data forms.

FIG. 5 is a diagram in which a simple data form is used to illustrate the idea in FIG. 4.

When an object to be drawn is an image, the object is developed into a multi-value bit map (5-1), and at the same time, bits that correspond to the object are set in an area in the image pattern plane (5-2).

Similarly, when an object to be drawn is a graphic figure, the object is developed into a multi-value bit map (5-3), and at the same time, bits that correspond to the object are set in an area in the graphics pattern plane (5-4).

The same process is performed for a text object.

Figure 6:
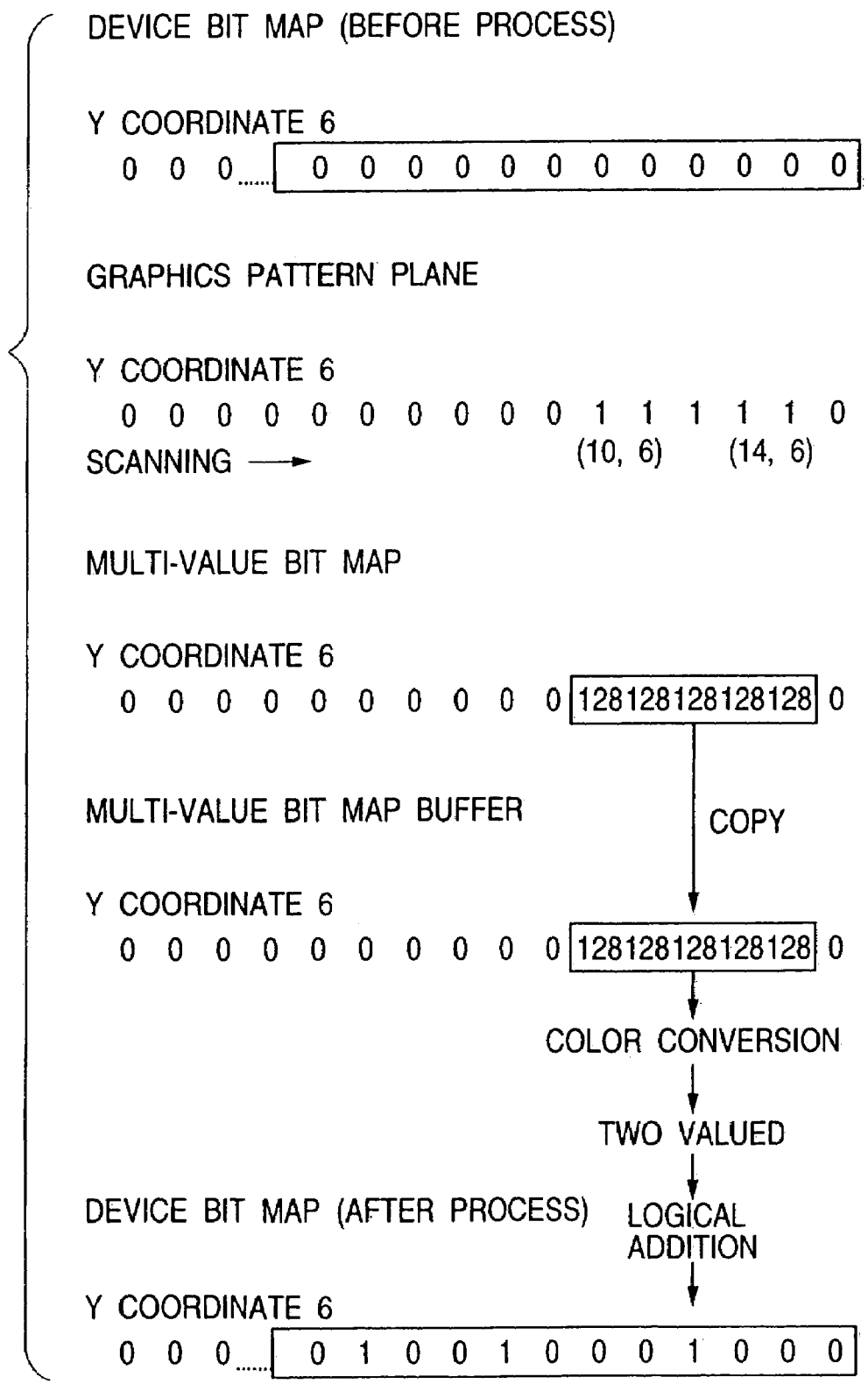
FIG. 6 is a diagram showing a process for scanning a pattern plane to extract bits for a multi-value bit map, for performing a color conversion and binarization process for each object, and for preparing a device bit map using the multi-value bit map.

FIG. 6 is a diagram showing a method for scanning an obtained pattern plane to perform a color process for each object.

One line of a pattern plane (a graphics plane in this example) is scanned to obtain the coordinates of a bit. Based on the coordinates, for the multi-value bit map pertinent color data are extracted, and color conversion and binarization are performed. Then, the logical sum of the results and the pertinent coordinates for a device bit map are calculated and stored.

An explanation will now be given, while referring to FIGS. 7 to 16, for a process for drawing a multi-value bit map in accordance with a specific drawing command, and a process for preparing a pattern plane for each attribute.

First, an explanation will be given, while referring to FIGS. 7 to 11, for a change in the status of a multi-value bit map upon the receipt of a drawing command.

By performing a logical calculation SRCCOPY, a rectangular image object (having an arbitrary color) is drawn in an initialized multi-value bit map (FIG. 7).

At the destination whereat the above rectangular image object (having an arbitrary color) is drawn by performing the logical calculation SRCCOPY, a rectangular bit map (FIG. 8) containing a graphics object, a black circle, is drawn by performing a logical calculation SRCAND (FIG. 9). Further, a rectangular bit map (FIG. 10) containing a graphics object, a blue circle with a black background, is drawn by performing a logical calculation SRCPAINT (FIG. 11).

In this case, the logical calculation SRCCOPY is a command for a process for writing a source (a rectangular image in FIG. 7) to a destination (an initialized multi-value bit map in FIG. 7). The logical calculation SRCAND is a command to perform an AND process for the source and the destination. And the logical calculation SRCPAINT is a command to perform an OR process for the source and the destination.

FIGS. 12 to 16 are diagrams for explaining a change in the status of a pattern plane for each attribute upon the receipt of the above drawing command.

A rectangular image object (having an arbitrary color) is drawn in an initialized pattern plane by performing the logical calculation SRCCOPY (FIG. 12).

At the destination (FIG. 12) whereat the above rectangular image object (having an arbitrary color) is drawn by performing the logical calculation SRCCOPY, a rectangular bit map (FIG. 13) containing a graphics object, a black circle, is drawn by performing the logical calculation SRCAND (FIG. 14). Further, a rectangular bit map (FIG. 15) containing a graphics object, a blue circle with a black background, is drawn by performing the logical calculation SRCPAINT (FIG. 16).

In this embodiment, for the black graphics object Os are written to all the image, text and graphics pattern planes. In other words, since R, G, B=0, black is written.

FIG. 17 is a diagram showing a method for using the arrangement of bits to obtain the coordinates of each object on a multi-bit map. That is, in FIG. 17 a method is shown for obtaining data 5-1 or 5-2 in FIG. 5.

Based on pattern planes prepared in response to a drawing command, i.e., a pattern plane for each object in FIG. 16, a logical product is obtained for the pattern planes of all the objects (17-1), and a logical sum is obtained for the logical product of the text and the image pattern planes, and the pattern plane of the graphics object (17-2).

In accordance with 17-1 and 17-2, the coordinates are calculated for each object on a multi-value bit map.

The image printing method, which is programmed in accordance with the image processing method flowcharts shown in FIGS. 21 and 22, will now be described while referring to the flowcharts in FIGS. 21 and 22.

When a print command is entered by the input device, of the OS, the driver and the application (FIG. 2) that are read from the auxiliary storage unit to the main storage unit, the OS receives the command. Thereafter, the OS transmits the print execution message to the application that is currently active.

The application converts the received message into a command that the OS can recognize, and transmits print data and the command message. Subsequently, the OS converts the data into a command that the driver can recognize, and transmits the message to the driver.

Upon receiving the initialization message, the driver allocates a pattern plane area to be used for the determination of an object and as a temporary storage area for a multi-value bit map, and erases the contents of these areas (21-0).

In accordance with the drawing command received from the OS, the driver develops the data to develop a multi-value bit map (21-1). Further, the driver determines whether the output destination of the drawing command is a temporary area or a multi-bit map area prepared as a device (21-2). When the output destination is a device, an object is determined by examining the drawing command (21-3), in which a color is designated for each object. For a graphics object, while black data are maintained, a bit is set in the pattern plane by using a 3-plane 1-bit driver (21-4). When all the drawing commands have been processed (21-5), one line of a pattern plane for each object is extracted (21-6), and the logical project is obtained for all the object patterns (17-1) (21-7). Thereafter, the logical product of the text and image planes is obtained, and the logical sum of that logical product and the graphics object is calculated (17-2) (21-8). Then, the logical product of all the object pattern planes, which was previously obtained, is scanned (21-9). When a 0 bit is found (21-10), a check is performed to determine whether a bit is set at the pertinent coordinates for the logical sum obtained for the graphics plane and the logical product of the text and image planes. In addition, a check is performed to determine whether all the patterns are 0 (21-11). When the bit is set, or if all the patterns are 0, data at the pertinent coordinates in the multi-value bit map are copied to a graphics buffer 21-12). If at step 21-11 a bit is not set, a check is performed to determine whether a bit is set at the pertinent coordinates in the image plane (21-13). If the bit is set, data at the pertinent coordinates in the multi-value bit map are copied to an image buffer (21-14). But if at step 21-13 the bit is not set, the data at the pertinent coordinates in the multi-value bit map are copied to a text buffer (21-15). When the processing for one line has been completed (21-16), the optimal color correction, color conversion and binarization (n-valued) processes are performed for the object in each buffer (21-17). Then, the logical sum of the results of the color process is obtained (21-18), and data for one line are transmitted to the printer (21-19). When the data for all the lines has been processed, the processing is terminated (21-10).

The processing performed from 21-11 to 21-15 corresponds to the processing from 17-4 to 17-6, in FIG. 17, for creating objects. The reason a determination is made at step 21-11 to ascertain whether all the patterns are 0 is that, as is shown in FIG. 13, 0s are written in all the patterns for the black graphics object.

According to this embodiment, an object consonant with the logical calculation can be precisely determined, and since the optimal color process is performed for each object, a high quality output can be acquired.

An explanation will now be given, while referring to FIGS. 23 to 25, of the effects obtained by the embodiment for determining the attribute of an object, while the black graphics object is reflected thereon.

First, an explanation will be given by using a drawing command for a multi-value bit map in FIG. 23 in which an image and gradation are combined.

The drawing command includes three steps: copying an image bit map (A) (step 1); drawing a mask bit map (B) in accordance with a logical product (step 2); and obtaining a logical sum of the results and a gradation bit map (C) for which the background is black (step 3).

Step 1 corresponds to FIGS. 1 and 12; step 2 corresponds to FIGS. 8 and 9 and FIGS. 13 and 14; and step 3 corresponds to FIGS. 10 and 11 and FIGS. 15 and 16.

In order to precisely determine the attribute of the object in this image, it is important that the area of the graphics be accurately identified. Generally, for this the driver performs the drawing process for each rectangle. This is because the management of coordinates is easier for the performance of the fast drawing process.

FIG. 24 is a diagram showing the processing results obtained when black data in FIG. 23 are reflected onto the bit map.

At steps 1 to 3, the change of a pattern plane in a pick-up portion in FIG. 24 is shown. In FIG. 24, at step 2 the data for an image plane in a circular area can be canceled by a mask bit map (i.e., the data can be 0s). At step 3, the graphics data can be defined only in the circular area (i.e., the data can be 1s). As for the black background area, the logical sum of 0 and the data for each plane prepared at step 2 is obtained; however, the data are not substantially changed. Therefore, it can be accurately determined that the circular area is a graphic image.

FIG. 25 is a diagram showing the processing results obtained when black data are not reflected onto the bit map.

The same processing as in FIG. 24 can be performed up to step 2. However, at step 3, since black data are not reflected, as is shown in (C) in FIG. 24, the rectangular area is determined to be graphics data. Therefore, the rectangular area, rather than the circular area that originally was determined to be an image area, is determined to be a graphic image.

When the black data are reflected (FIG. 24) in the above described manner, the object determination can be performed normally. However, when the object is being processed by using a color allocated for the object while black data are not reflected (FIG. 25), the bits of the image plane and the bits of the graphics object are set, so that the object determination can not be performed normally.

In the optimal color process for each object, for example, a coefficient for color conversion, and the size of a dither matrix for binarization and a threshold value are consonant with the attribute of an object. The size of an n-valued dither matrix, a threshold value and the number of sheets may be consonant with the attribute of an object.

In addition, a multi-value output can be easily coped with, and the number of development procedures can be reduced in the future.

Figure 18:
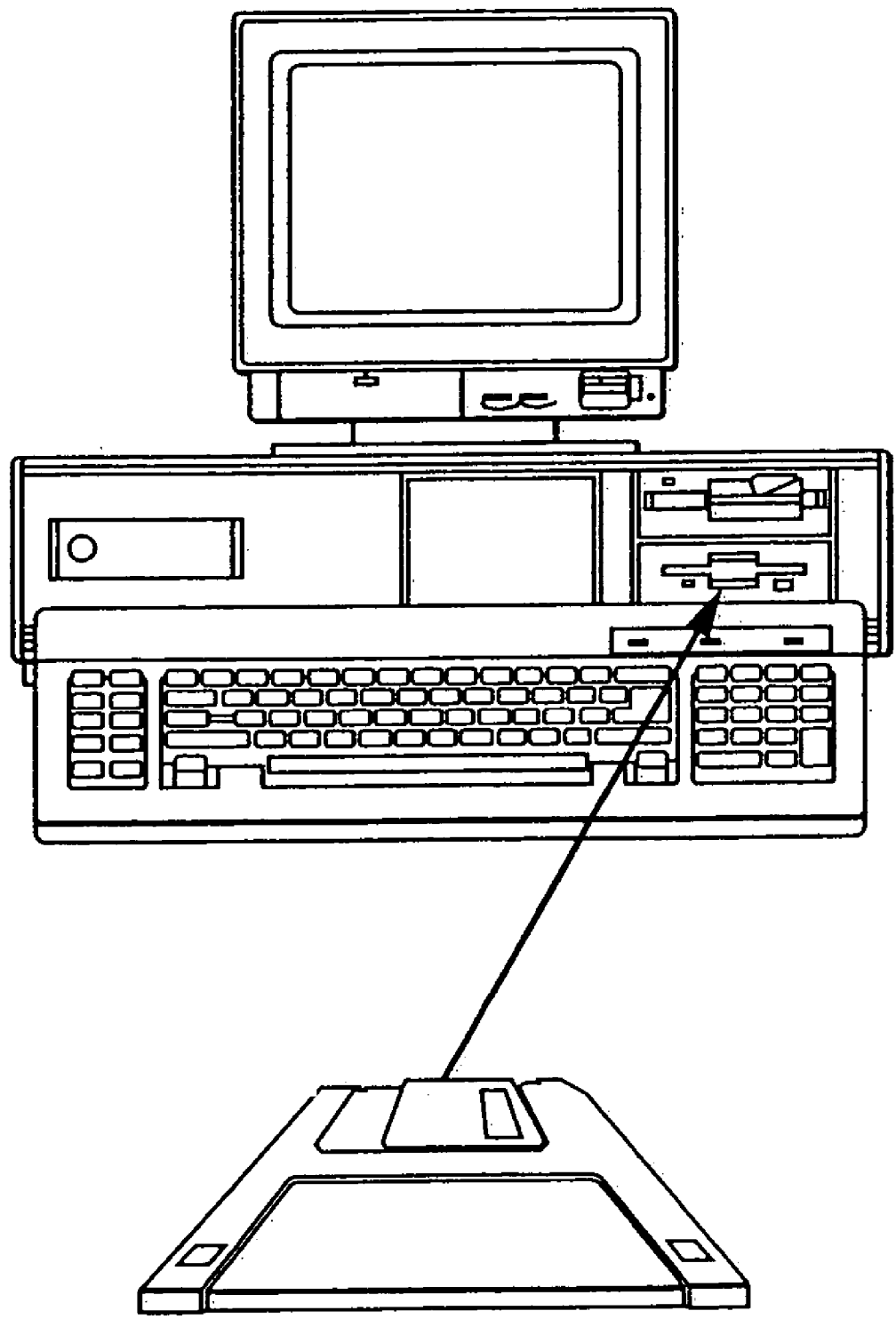
FIG. 18 is a diagram showing the state wherein the image processing control program and associated data are loaded into a computer via an FD.

FIG. 18 is a diagram showing the state when an FD is used to load the image processing control program and the associated into a computer. When the FD is inserted into the medium reading unit, the image processing control program and the associated data are read from the FD under the control of the OS and the basic I/O program, and are loaded into the main storage unit so that the operation can be initiated.

Figure 19:
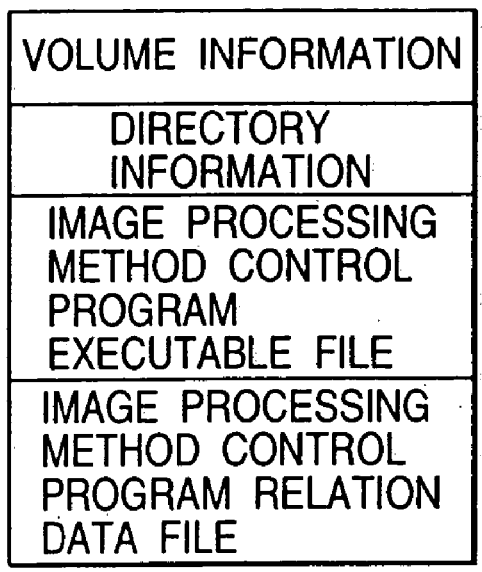
FIG. 19 is a diagram showing a memory map of an FD on which the image processing control program is stored.

FIG. 19 is a diagram showing a memory map for an FD on which the image processing control method program is stored.

Figure 20:
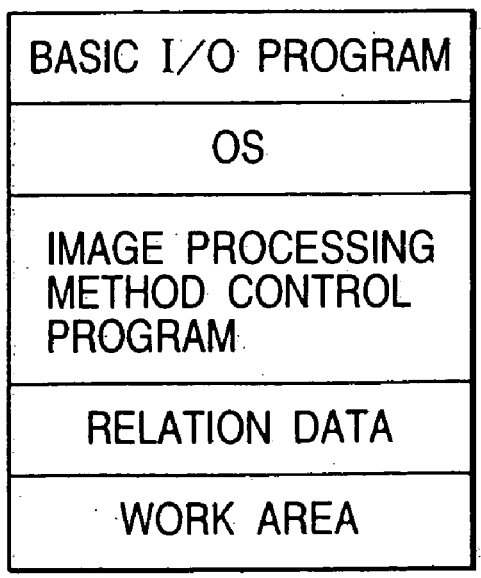
FIG. 20 is a diagram showing a memory map wherein an image processing control program stored on an FD is loaded from an auxiliary storage device, via a medium reading unit, to a main storage device.

FIG. 20 is a diagram showing a memory map when the image processing control program stored on the FD is loaded, via the medium reading unit, from the auxiliary storage unit to the main storage unit.

In this embodiment, the image processing control program is read from the FD, via the auxiliary storage unit, and is written directly to the main storage unit. directly. However, the image processing control program stored on a storage medium, such as an FD, may be saved to an auxiliary storage unit, such as an HD, and can thereafter be read to the main storage unit when it is to be executed.

In addition to an FD or an HD, a storage medium for recording the image processing control program may be a magneto-optical disk, a CD-ROM or an IC memory card. Furthermore, the image processing control program may also be stored in a ROM.

In the above embodiment, a binding printer or a no-binding printer can be employed. Further, although normally data for individual lines are transmitted to the printer, the data for several lines may be stored in a buffer and may be transmitted to the printer as a block. Also, the color correction process may be performed immediately before step 21-1, whereat color data are developed into a multi-value bit map.

In this embodiment, the RGB (Red, Green, Blue) 3-plane 1-bit driver has been employed to prepare the pattern planes for processing each object. However, the CMYK (Cyan, Magenta, Yellow, Black) 4-plane 1-bit driver may be employed.

(Embodiment 2)

Figure 26:
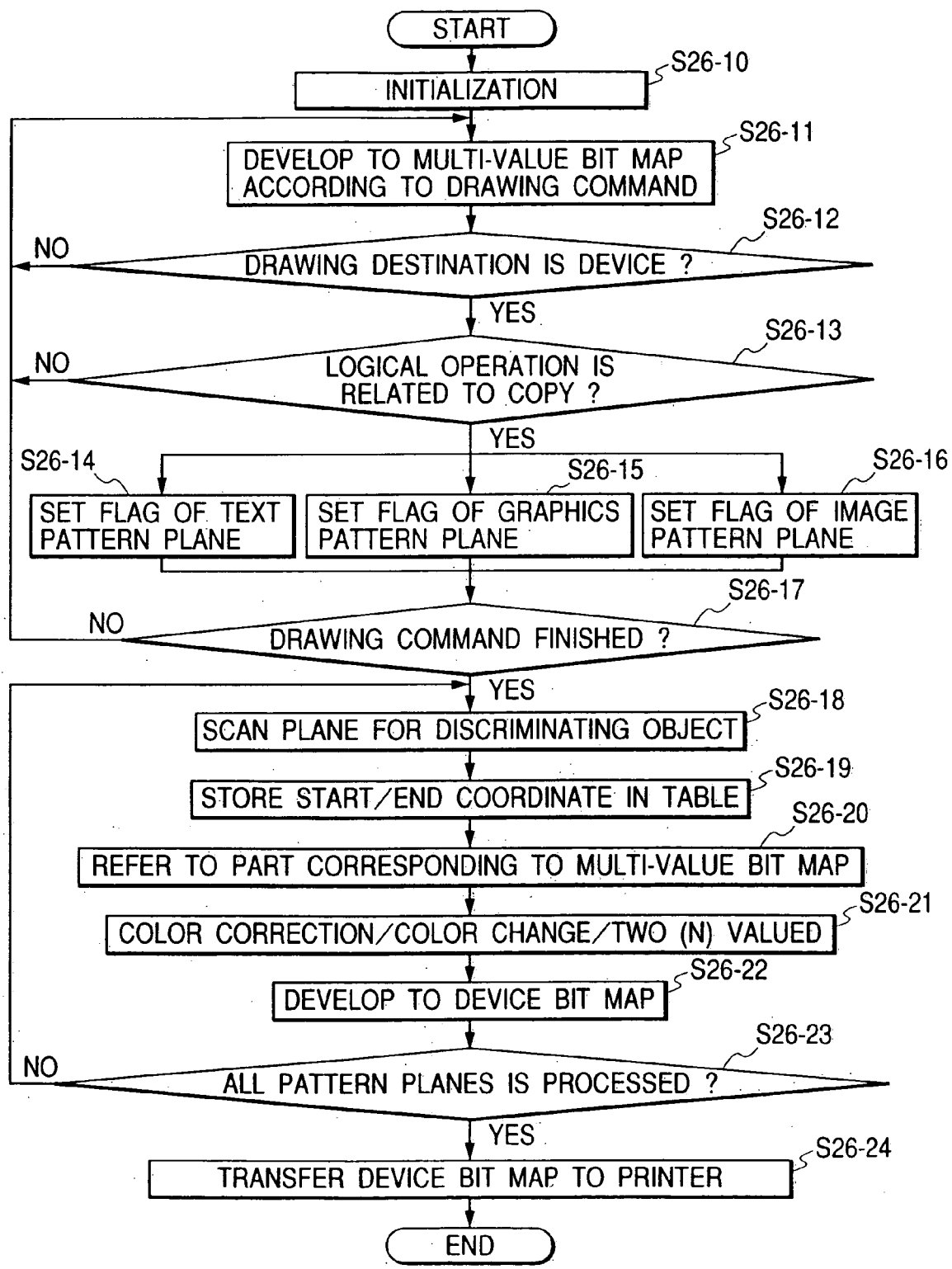
FIG. 26 is a flowchart showing the image processing according to a second embodiment of the present invention.

The image processing according to a second embodiment will now be descried while referring to the flowchart in FIG. 26.

First, when a command is entered by the input unit 4 to execute printing, the OS receives its message.

The OS transmits the print execution message to the application that is currently active. The application converts the received message into a command that the OS can recognize, and transmits print data and the command message to the OS. The OS converts the data into a command that the driver can recognize, and transmits the message to the driver.

Upon receiving the message for initialization, the driver allocates a pattern plane area, which is used for determination of an object, and a temporary storage area for a multi-value bit map, and erases the contents of these areas (step S26-10).

In accordance with the drawing command received from the OS, the driver develops the data into a multi-value bit map (step S26-11).

Further, the driver determines whether the output destination given in the drawing command is a temporary area or whether a multi-bit map area has been prepared as a device (step S26-12).

When the output destination is a device, a check is performed to determine whether the logical calculation included in the drawing command is associated with copy (COPY) (step S26-13).

When the logical calculation is associated with copy, based on the drawing command, the flag bit is set for the pattern plane that is prepared for each object (steps S26-14 to S26-16).

Specifically, the flag bit is set for the text plane pattern at step S26-14, set for the graphics pattern plane at step S26-15, or set for the image pattern plane at step S26-16.

A check is performed to determine whether all the drawing commands have been processed (step S26-17). When all the drawing commands have been processed, the flag bit of the prepared pattern plane is scanned (step S26-18).

When the flag bit is set, the start and end coordinates of the bit that is set are stored in the table 70 (FIG. 28) (step S26-19).

The pertinent portion of the multi-value bit map is referred to by using the coordinates stored in the table 70 (step S26-20), and the color process, such as color correction, color conversion or binarization (n-valued process), is performed in consonance with the attribute of the object (step S26-21).

The data obtained by the color process are sequentially developed in the pertinent area of the device bit map (step S26-22).

A check is performed to determine whether all the pattern planes have been processed (step S26-23). When all the pattern planes have been processed, the device bit map is transmitted to the printer 7 (step S26-24). The image processing is thereafter terminated.

FIG. 27 is a diagram showing the method for scanning a pattern plane and for performing a color process for each object.

In this embodiment, one line (Y coordinate 6) of an area 62 of a graphics pattern plane 41, which corresponds to graphics data 61 of a multi-value bit map, is scanned to obtain the coordinates whereat flag bits are set. In the graphics pattern plane 41, the flag bits are set in the range extending from the coordinates (10, 6) to (14, 6).

The start point and end point of the flag bits that are obtained by scanning the coordinates are stored as coordinate data in the table.

FIG. 28 is a diagram showing the table 70 in which the coordinate sets obtained by scanning the pattern plane are stored.

For coordinate data 1 to 4, the start point is stored at the X coordinate and the end point is stored at the Y coordinate. For example, for the graphics pattern plane 41 in FIG. 27, the start point is at the coordinates (10, 6) while the end point is at the coordinates (14, 6).

Following this, as is shown in FIG. 27, pertinent color data for the multi-value bit map are extracted based on the coordinate data in the table 70, and a color conversion and binarization (n-valued) process is performed for the color data in consonance with the attribute of the object. The results are stored at the coordinates in a pertinent area 63 on the device bit map 45.

In this embodiment, a binding printer or a non-binding printer can be used as the printer 7.

The color correction process may be performed immediately before step S26-11, whereat the data are developed into a multi-value bit map.

The process for each object is performed for three types: text, graphics or pattern. However, when the number of pattern planes is changed, the number of the processes for the individual objects can also be changed.

The process for developing a multo-value bit map into a device bit map (step S26-22) may be performed either when the coordinate data have been stored in the table 70 and all the data for one line has been scanned, or when all the bits on one pattern plane have been arranged.

In the second embodiment as well as in the first embodiment, the program for executing the image processing in FIG. 26 is loaded into the main storage unit. The program may be also recorded on an FD, an HD, a CD-ROM or an IC memory card.

The present invention may be applied to a system constituted by a plurality of apparatuses or to a single apparatus.

The following system or apparatus is also included within the scope of the present invention for the implementation of the aforementioned objectives of the present invention: software program code, for implementing the functions of the above embodiments, is loaded into a computer (a CPU or an MPU) in an apparatus or in a system that is connected to and that activates various devices, and the program code is read by the computer in the system or the apparatus.

In this case, the software program code accomplishes the functions of the above described embodiments and of the program code itself, and means for supplying the program code to the computer, e.g., a storage medium on which such program code is recorded, constitute the present invention.

A storage medium for supplying such program code can be, for example, a floppy disk, a hard disk, an optical disk, a magneto-optical disk, a CD-ROM, a magnetic tape, a nonvolatile memory card, or a ROM.

In addition, the present invention includes not only a case wherein the functions in the previous embodiment can be performed when program code is read and executed by the computer, but also a case wherein, in accordance with an instruction in the program code, in an OS (Operating System) running on the computer or in another application software program, the computer interacts with the program code to accomplish the functions in the above embodiments.

Furthermore, the present invention includes a case wherein program code, read from a storage medium, is written in a memory that is mounted on a function expansion board inserted into a computer, or on a function expansion unit connected to a computer, and in consonance with a program code instruction, a CPU mounted on the function expansion board or in the function expansion unit performs one part, or all, of the actual processing in order to implement the functions in the above described embodiments.

The forgoing description of the embodiments has been given for illustrative purposes only, and is not to be construed as imposing any limitations, in any respect.

The scope of the invention is, therefore, to be determined solely by the following claims; it is not limited by the text of the specifications, and alterations made that fall within the scope of the claims reflect the true spirit and the intent of the invention.

What is claimed is:

1. A printer driver comprising:
   developing means for developing a multi-bit map in accordance with a drawing command;
   determination means for determining an attribute for an object based on the drawing command;
   developing means for developing a bit map corresponding to the drawing command in a pattern plane corresponding to the attribute of the object; and
   control means for controlling a color process to be performed on the multi-bit map in accordance with flag information,
   wherein the attribute of the object is text, graphics or image, wherein a logical product of pattern planes for all the objects, a logical sum of a graphics pattern plane and a logical product of text and image pattern planes are obtained, and wherein the color process is controlled based on the logical products and the logical sum.

2. A printer driver according to claim 1, wherein the color process includes a color conversion process and an n-valued process.

3. A printer driver according to claim 1, wherein, for a black graphic object, a bit map is developed for the text, the image and the graphic pattern planes.

4. A control method for a printer driver, comprising:
   a developing step of developing a multi-bit map in accordance with a drawing command;
   a determination step of determining an attribute for an object based on the drawing command;

a developing step of developing a bit map corresponding to the drawing command in a pattern plane corresponding to the attribute of the object; and a control step of controlling a color process to be performed on the multi-bit map in accordance with flag information, wherein the attribute of the object is text, graphics or image, wherein a logical product of pattern planes for all the objects, a logical sum of a graphics pattern plane and a logical product of text and image pattern planes are obtained, and wherein the color process is controlled based on the logical products and the logical sum.

5. A method according to claim 4, wherein the color process includes a color conversion process and an n-valued process.

6. An image processing method according to claim 4, wherein, for a black graphic object, a bit map is developed for the text, the image and the graphic pattern planes.

* * * * *

UNITED STATES PATENT AND TRADEMARK OFFICE
CERTIFICATE OF CORRECTION

PATENT NO. : 7,193,750 B2
APPLICATION NO. : 11/032100
DATED : March 20, 2007
INVENTOR(S) : Yoshinari Ohnishi It is certified that error appears in the above-identified patent and that said Letters Patent is hereby corrected as shown below:

ON COVER PAGE AT (54) TITLE

"THEREFORE" should read --THEREFOR--.

SHEET 19

Figure 21:
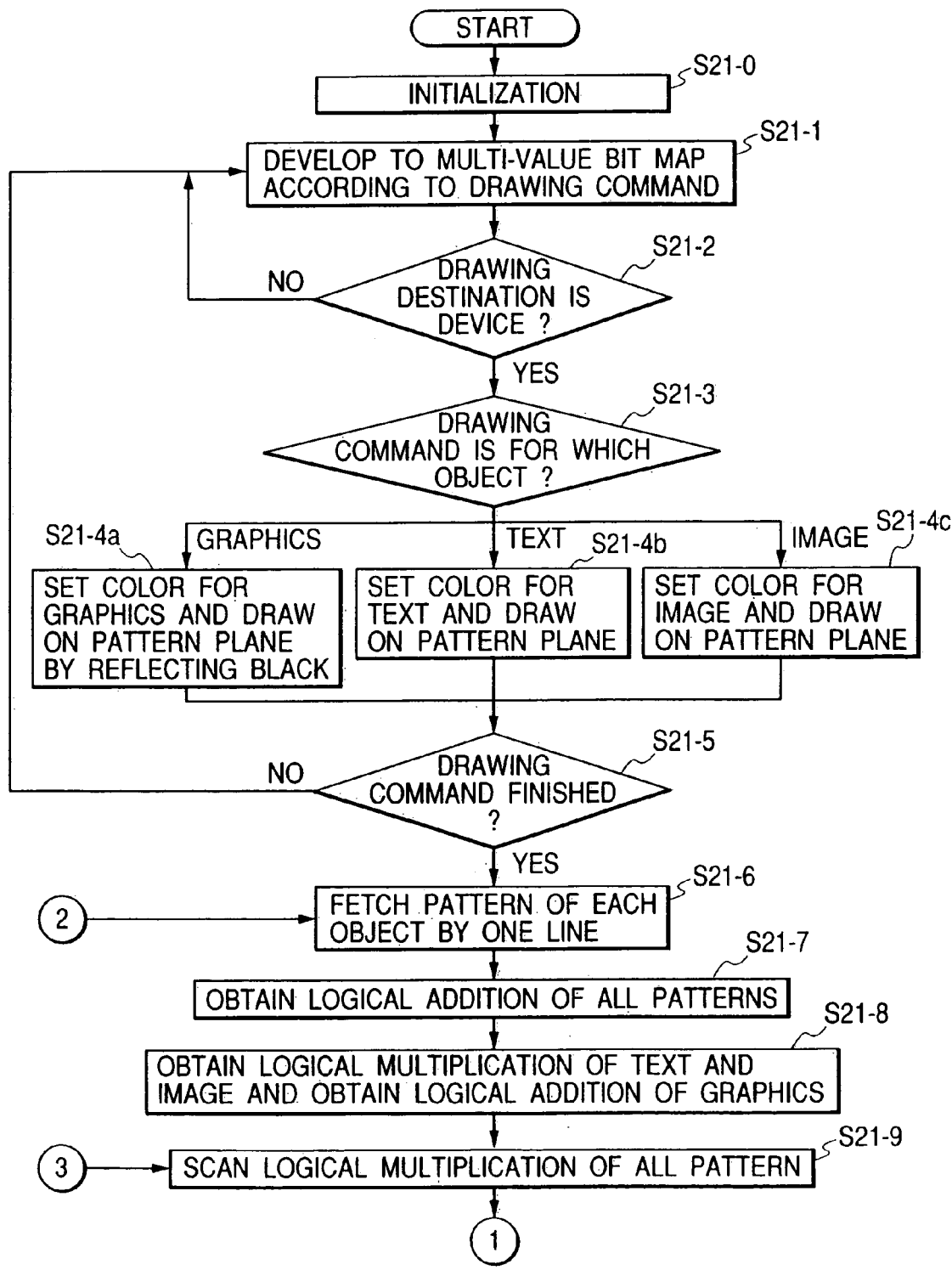
FIG. 21 is a flowchart showing the image processing method according to a first embodiment of the present invention.

Figure 21, "PATTERN" should read --PATTERNS- --.

SHEET 20

Figure 22:
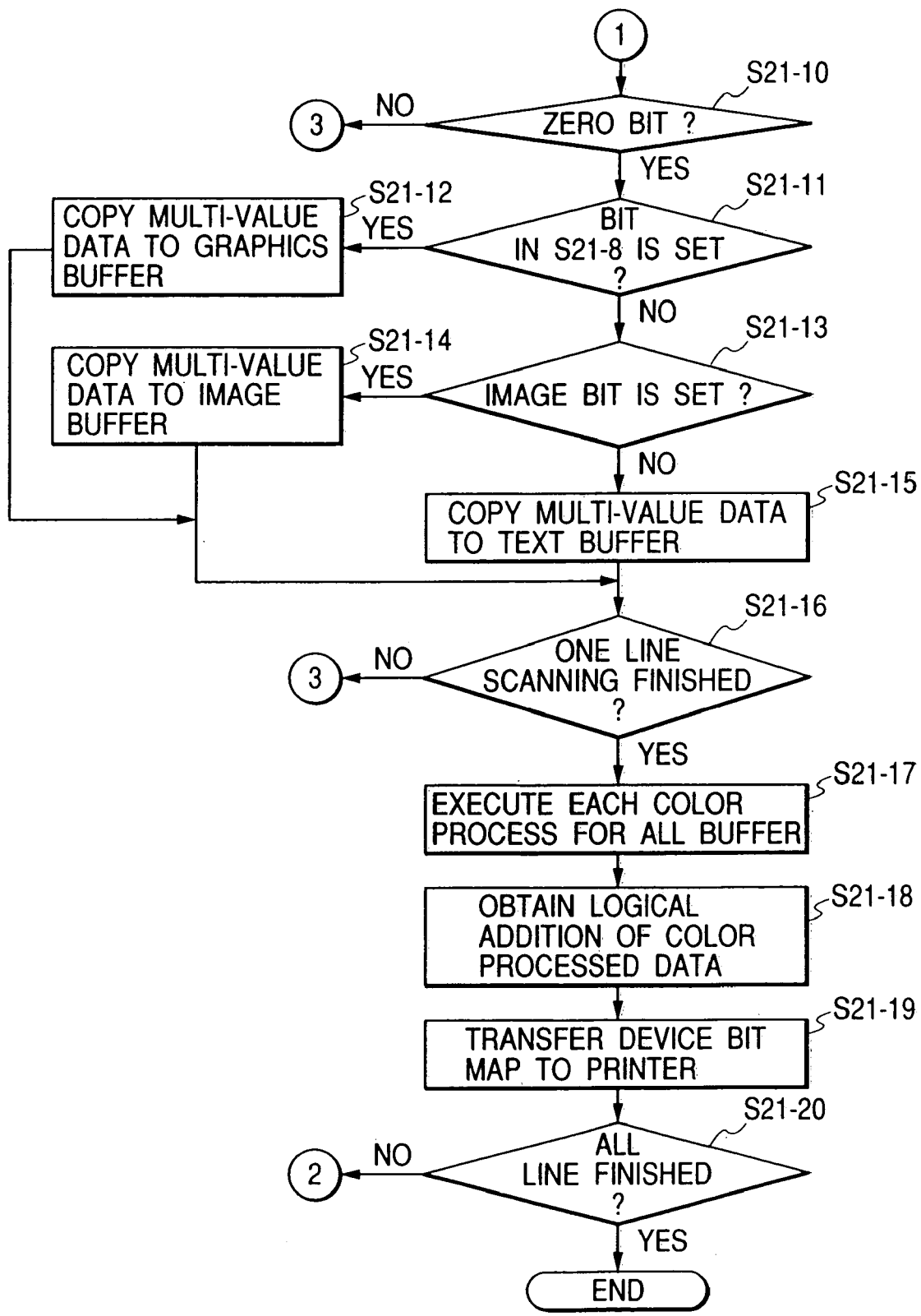
FIG. 22 is a flowchart showing the image processing method according to the first embodiment.

Figure 22, "BUFFER" should read --BUFFERS--; and "LINE" should read --LINES--.

COLUMN 1

Line 3, "THEREFORE" should read --THEREFOR--; and
Line 40, "there printers" should read --there are printers--.

COLUMN 3

Line 57, "a." should read --a--.

COLUMN 6

Line 30, "21-12)." should read --(21-12).--; and
Line 44, "(21-10)." should read --(21-20).--.

COLUMN 7

Line 19, "is" should read --are--; and
Line 65, "unit." should read --unit--.

COLUMN 8

Line 23, "descried" should read --described--.

COLUMN 9

Line 48, "multo-value" should read --multi-value--.

UNITED STATES PATENT AND TRADEMARK OFFICE
CERTIFICATE OF CORRECTION

| | |
|---|---|
| PATENT NO. | : 7,193,750 B2 |
| APPLICATION NO. | : 11/032100 |
| DATED | : March 20, 2007 |
| INVENTOR(S) | : Yoshinari Ohnishi |

It is certified that error appears in the above-identified patent and that said Letters Patent is hereby corrected as shown below:

COLUMN 10

Line 5, "constitute" should read --constitutes--.

COLUMN 12

Line 7, "An image processing method" should read --A method--.

Signed and Sealed this

Twenty-seventh Day of November, 2007

JON W. DUDAS
*Director of the United States Patent and Trademark Office*